United States Patent Office 3,145,225
Patented Aug. 18, 1964

3,145,225
BICYCLO[3.3.3]PENTASILOXANES
John F. Brown, Jr., Schenectady, N.Y., assignor to General Electric Company, a corporation of New York
No Drawing. Filed May 6, 1963, Ser. No. 278,490
3 Claims. (Cl. 260—448.2)

This invention is concerned with bicyclo[3.3.3]pentasiloxane ring compounds of the general formula

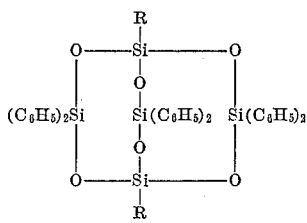

where R is a member of the class consisting of methyl and phenyl radicals.

The compositions embraced by the above formula have many uses and particularly as intermediates in the preparation of other organopolysiloxane compositions. Thus, these pentasiloxanes can be heated at temperatures of from 90 to 150° C. with small amounts, for instance, from about 0.001 to 0.1 percent, by weight, thereof of an alkaline material, such as, potassium hydroxide, cesium hydroxide, tetramethyl ammonium hydroxide, etc., to effect opening of the ring structure to yield organopolysiloxane resins useful for insulating and coating purposes, particularly where heat-resistant protection is desired. The fact that one is able to start with a predetermined ring structure containing both difunctional siloxy units (i.e., diphenylsiloxy units) and trifunctional siloxy units (i.e., monomethylsiloxy units or monophenylsiloxy units) leads to resinous polysiloxanes which have a regularity in their recurring unit structure as contrasted to the usual types of resin compositions which have randomly distributed units usually formed by the cohydrolysis of, for instance, organochlorosilanes such as diphenyldichlorosilane and either methyltrichlorosilane or phenyltrichlorosilane.

Alternatively, these cyclopentasiloxanes can be intercondensed, again with alkaline condensing agents, at temperatures of from 90 to 150° C. with other organopolysiloxanes, for example, organocyclopolysiloxanes, such as octamethylcyclotetrasiloxane, octaphenylcyclotetrasiloxane, hexaphenylcyclotrisiloxane, etc., to give recurring units derived from the cyclopentasiloxane and the other intercondensed cyclic organopolysiloxanes. Lubricating fluids as well as fluids for hydraulic purposes can also be obtained by copolymerizing the aforesaid cyclopentasiloxanes with cyclopolydiorganosiloxanes (such as octamethylcyclotetrasiloxane) and chain-stopping compositions, such as hexamethyldisiloxane, octamethyltrisiloxane, etc. in the presence of alkaline condensation and polymerization catalysts, some of which have been mentioned above, wherein these fluids have not only high temperature properties but also low temperature characteristics due to the presence of the branching introduced by the trifunctional monomethylsiloxy unit or the monophenylsiloxy unit.

In order that those skilled in the art may know how the compounds of the present invention may be prepared, the following examples are given by way of illustration.

Example 1

13.85 grams of diphenylsilanediol was dissolved in 12.5 ml. pyridine and enough benzene was added to the solution to make a total of 100 ml. A solution was also prepared from 6.38 grams of methyltrichlorosilane and enough benzene to make a total volume of 100 ml. While protecting both the above solutions from moisture by means of drying tubes, the two solutions were added slowly and at about equal rates over a period of three hours to 250 ml. benzene while the latter was being stirred vigorously. After the addition of the two solutions, the mixture of ingredients was stirred for an additional one-half hour, and thereafter 50 ml. water was added to dissolve the precipitated pyridinium hydrochloride and to hydrolyze any unreacted methyltrichlorosilane. The benzene layer which was obtained was separated, washed twice with dilute hydrochloric acid, washed several times with water, dried over anhydrous sodium sulfate, and then evaporated on a steam-bath to remove the benzene. The resulting viscous fluid was diluted with about 10 ml. benzene, heated to boiling to insure complete solution in the benzene, and thereafter an equal volume of ethyl alcohol was added. To induce crystallization, this mixture of ingredients was held at about 0° C. for about 18 hours after which a copious quantity of crystals was obtained. These crystals were removed by filtration, and thereafter recrystallized by dissolving the crystals in hot benzene, and adding enough ethanol to effect precipitation of white crystals which melted at 211.5–212.5° C. This compound was identified as 1,5-dimethyl-3,3,7,7,10,10-hexaphenylbicyclo[3.3.3]pentasiloxane having the formula

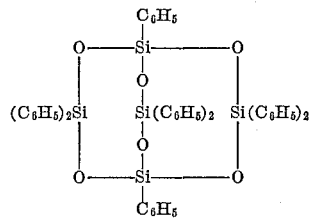

The identity of this composition was established by means of analysis which showed the compound contained 62.6 percent carbon and 5.1 percent hydrogen as contrasted to the theoretical values for the compound of 62.6 percent carbon and 5.0 percent hydrogen. The infrared spectrum of the compound in $CS_2$ showed Si—O—Si stretching bands characterizing the bicyclo[3.3.3]pentasiloxane structure at 1055 cm.$^{-1}$ and 1097 cm.$^{-1}$.

Example 2

About 8.46 grams of phenyltrichlorosilane was dissolved in a sufficient amount of benzene to make a total volume of 100 ml. Another solution was made by dissolving 12.98 grams diphenylsilanediol in 12.5 ml. pyridine and enough benzene was added to make a total volume of about 100 ml. The two benzene solutions were then reacted together similarly as was done in Example 1 by adding them to benzene and thereafter worked up in the same manner as in Example 1 as regards the isolation, crystallization and recrystallization stages to yield a white crystalline material melting at 277–277.5° C. This compound was identified as 1,3,3,5,7,7,10,10-octaphenylbicyclo[3.3.3]pentasiloxane having the formula

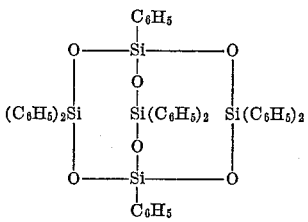

as evidenced by the analysis which showed that the compound contained 67.7 percent carbon and 5.0 percent hydrogen as contrasted to theoretical values of 67.6 percent carbon and 4.7 percent hydrogen. The infrared spectrum of the compound in $CS_2$ showed Si—O—Si stretching bands characterizing the bicyclo[3.3.3]pentasiloxane structure at 1058 cm.$^{-1}$ and 1093 cm.$^{-1}$.

The molecular weights of each of the compositions obtained in Examples 1 and 2 were determined and in each instance the molecular weight established that the compounds were pentasiloxanes, i.e., they contained two trifunctional groups and three difunctional groups.

What I claim as new and desire to secure by Letters Patent of the United States is:

1. A composition of matter having the formula

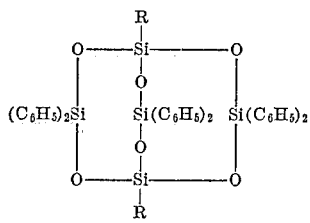

where R is a member selected from the class consisting of the methyl and phenyl radicals.

2. The compound 1,5 - dimethyl - 3,3,7,7,10,10-hexaphenylbicyclo[3.3.3]pentasiloxane having the formula

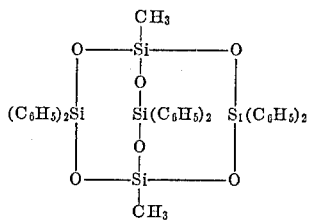

3. The compound 1,3,3,5,7,7,10,10-octaphenylbicyclo[3.3.3]pentasiloxane having the formula

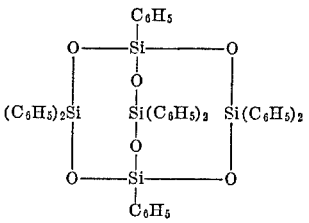

References Cited in the file of this patent
UNITED STATES PATENTS
2,418,051 Scott ------------------ Mar. 25, 1947